US005836069A

United States Patent [19]
Fallandy et al.

[11] Patent Number: 5,836,069
[45] Date of Patent: Nov. 17, 1998

[54] IMPACT TOOL HEAD HAVING CUTTING KNIFE INTEGRALLY MOLDED WITH WIRE-INSERTION BLADE

[75] Inventors: Michael M. Fallandy, Ventura; Edward J. Zoiss, Moorpark, both of Calif.

[73] Assignee: Harris Corporation, Melbourne, Fla.

[21] Appl. No.: 754,021

[22] Filed: Jan. 29, 1996

[51] Int. Cl.[6] .......... B23P 23/00

[52] U.S. Cl. .......... 29/566.4; 29/750

[58] Field of Search .......... 29/566.3, 566.4, 29/729, 750, 751

[56] References Cited

U.S. PATENT DOCUMENTS

| | | | |
|---|---|---|---|
| 3,883,316 | 5/1975 | Mason | 29/566.4 |
| 3,898,724 | 8/1975 | Conorich | 29/566.4 |
| 4,161,061 | 7/1979 | Mason et al. | 29/566.4 |
| 4,241,496 | 12/1980 | Gregson | 29/566.4 |
| 4,306,349 | 12/1981 | Knickerbocker | 29/566.4 |
| 4,318,215 | 3/1982 | Holt | 29/566.3 |
| 4,656,725 | 4/1987 | Knickerbocker | 29/566.4 |
| 5,568,686 | 10/1996 | Suarez | 29/566.3 |

*Primary Examiner*—A. L. Pitts
*Assistant Examiner*—Christopher Kirkman
*Attorney, Agent, or Firm*—Charles E. Wands

[57] ABSTRACT

A wire-insertion and cutting head for a telephone wire installing impact tool has a plurality of unitary wire-insertion and cutting blade elements embedded in a single resilient cutting blade support block. Each wire-insertion and cutting blade element has both a wire-insertion blade and an increased thickness knife edge molded as a single continuous hardened steel element. The knife edge is located relative to the slot in the cutting blade to ensure that the knife edge will consistently and reliably effect a clean cut of a respective wire against the surface of the terminal receptacle, as the wire is urged into the terminal receptacle by the blade during operation of the impact tool.

13 Claims, 3 Drawing Sheets

IMPACT TOOL HEAD HAVING CUTTING KNIFE INTEGRALLY MOLDED WITH WIRE-INSERTION BLADE

FIELD OF THE INVENTION

The present invention relates in general to impact tools of the type employed in the telephone industry for seating and cutting the free end of each of one or more wires into resilient terminal receptacles mounted to connector blocks of telephone office mainframes, and is particularly directed to a new and improved impact head, in which a plurality of wire-insertion and cutting blade elements are captured in a resilient support block, each wire-insertion and cutting blade element having a wire-insertion blade and a cutting knife molded into a unitary blade structure, configured so that the cutting knife will effect a clean cut of a respective wire against the surface of the terminal receptacle as the wire is urged into the receptacle by the wire-insertion blade portion of the element.

BACKGROUND OF THE INVENTION

The telephone industry currently offers its craftspersons a variety of impact tool configurations for cutting and seating individual telephone wires in terminal blocks that are mounted to telephone office mainframe units. For a non-limiting illustration of documentation describing examples of such impact tools, attention may be directed to U.S. Pat. Nos. 5,195,230, 4,696,090, 4,567,639, and 4,241,496 and the patents cited therein.

A typical impact tool has a generally longitudinal handle from which a wire-insertion and cutting head extends. The interior of the handle may contain an axially translatable hammer element, which is biased by a compression spring to strike the head, and thereby cut one end of a wire that has been inserted into a wire capture and gripping end region of the head. As the craftsperson grasps the handle and pushes it against a wire in a terminal receptacle, a hammer release element within the handle is moved into alignment with the hammer travel path, so that the forced stored in a main spring is mechanically released, causing the hammer to rapidly impact the head, so that the end of the wire is cut and becomes securely seated in the terminal.

The configuration of a conventional wire-insertion and cutting head, such as that employed by an AT&T model 788J1 impact tool and a Siemens model S788J tool, is diagrammatically illustrated in perspective in FIGS. 1 and 2 as comprising a wire-insertion and seating blade capture block 10 and a knife support block 20. The wire-insertion and seating blade capture block 10 includes a plurality of (ten) slotted copper wire-insertion blades 12 that are captured within respective slots 14, formed in a base region 15 of the block 10 and extending into respective standoffs 16, that project from a first wall 18 along a first side edge of the block 10. A side surface 19 of block 10 has a longitudinal groove 17 that mates with an engaging rim or lip in a head receiving channel of an impact tool.

Each wire-insertion blade 12 is formed of a pair of tines 21 and 22, spaced apart from one another by a slot 25. One of the tines, shown at 21, is securely captured in a standoff 16, while the other tine shown at 22 projects upwardly from a ledge surface 24 of the block 10, and has its side edge 26 approximately aligned with a second side 28 of the block. The second side 28 of the block 10 terminates at a base region 32, which includes a pair of projections or ribs 34 and 36 that cooperate with associated depressions 42 in knife support block 20, shown in the partially cut-away perspective view of FIG. 2. The ribs and their associated depressions serve to align a first side edge 44 of knife support block 20, when it is seated against the second side 28 and base region 32 of wire-insertion and blade support block 10.

The knife support block 20, is made of an injection-molded insulating material and contains a plurality of razor blade-like cutting knives 52, that have been securely retained in the block 20 by integrally molding the material of the block around the knives 52. Each cutting knife 52 is slightly offset from the first side edge 44 of block 20 by a slight distance 54.

To assemble the cutting head, the blade knife support block 20 of FIG. 2 is placed upon base region 32 of the wire-insertion and blade support block 10 of FIG. 1, so that, as shown in the end view of FIG. 3, each cutting knife 52 is disposed adjacent to and alongside side edge 26 of a respective wire-insertion blade tine 22 of block 10, and projects beyond the tines 21 and 22.

As diagrammatically illustrated in FIGS. 4 and 5, in accordance with the intended functionality of the wire-insertion and cutting assembly of FIGS. 1–3, when the impact tool is operated, the tines 21 and 22 of a respective wire-insertion blade 12 are inserted into a slot 62 in a terminal receptacle 60, so as to engage a wire 65 that has been placed in the slot and push the wire down into the slot 62 to firmly seat the wire against a bottom surface 67 of the slot. As the wire 65 becomes seated in slot 62 as a result of downward movement of the wire-insertion blade 12 into the slot 62, the knife 52 will have travelled alongside a side edge portion 68 of the terminal receptacle 60 and will cut the wire 65 with a guillotine type of shearing/cutting action at that point. Unfortunately, the experience of craftspersons in the field with such an impact tool head structure has revealed that the wire 65 is not necessarily cut in the manner intended, but may be either only partially sheared or not cut at all. The present inventors have discovered that this problem is due to the two-piece configuration of the cutting knife and wire-insertion blade support assembly of FIGS. 1 and 2.

More particularly, as described above, in the conventional wire-insertion and cutting head assembly, the knife support block 20 is formed as a separate piece from the wire-insertion blade support block 10, and is configured such that, in its installed position against the second side 28 and the base region 32 of block 10, the wire-cutting knives 52 of block 20 are located adjacent to side edges 26 of the wire-insertion blades 12, so that each knife may cut a respective wire at that point. However, since the cutting knife support block 20 is separate from the wire-insertion blade support block 10, even when the knife support block 20 is aligned with and engages wire-insertion blade support block 10 (by means of depressions 42 of block 20 and the ribs 34 and 36 of block 10), a small amount of play is permitted between the two blocks.

As shown in FIG. 6, this small amount of play, coupled with the offset 56 between the cutting edge 55 of the knife 52 and the side edge 26 of the wire-insertion blade 12, facilitates deflection of the razor blade-like knives around the lip or edge 66 of the terminal receptacle 60, and allows the entry of foreign matter between the wire-insertion blade support block 10 and the knife support block 20. As a consequence, rather than cut the wire 65, the knife 52 either deflects along the exterior of the wire jacket 69 or slightly cuts into the jacket, bending the wire 65 around the edge 66 and down adjacent to the side edge 68 of the terminal receptacle 60.

Moreover, this problem is exacerbated if the craftsperson fails to properly align the impact tool with the terminal receptacle. If the tool is tilted at an angle, for example, rather than being normal to the receptacle, the knife 52 may dig into the receptacle or may extend so far over the edge 66 that the knife does nothing more than bend the wire, without cutting the wire. Any wires that remain uncut as a result of the failure of the impact tool's seating and cutting head to cut such wires, which become seated at the bottom 67 of the terminal receptacle slot 62, must be severed individually by the craftsperson with a separate wire cutter.

SUMMARY OF THE INVENTION

In accordance with the present invention, the shortcomings of a conventional wire-insertion and cutting head of a telephone craftsperson's impact tool described above are effectively obviated by replacing the two piece wire-insertion blade and cutting knife assembly with an impact head configuration, in which a plurality of unitary wire-insertion and cutting blade elements are installed in a single resilient cutting blade support block. Each wire-insertion and cutting blade element comprises both a wire-insertion blade and a wire-severing, increased thickness knife edge formed (molded) into a single hardened steel continuous element, so as to prevent play between the insertion blade and the knife edge and to locate the knife edge relative to the slot in the cutting blade to ensure that the knife edge will consistently and reliably effect a clean cut of a respective wire against the surface of the terminal receptacle, as the wire is urged into the terminal receptacle by the blade during operation of the impact tool.

The cutting blade support block may be made by plastic injection molding a suitable resilient insulating material around a parallel arrangement of hardened steel cutting blades, with multiple spaced apart blades securely captured along a longitudinal channel of the cutting blade support block. A respective cutting blade has a generally U-shaped outer cutting blade portion that surrounds a channel region, in which a reduced thickness interior wire-insertion blade portion is provided. The generally U-shaped outer cutting blade portion has a first leg portion, which adjoins a first blade tine and terminates at a generally planar end face, that is coplanar with the end face of the other blade tine. The blade tines project from a body portion and are spaced apart from one another by a slot.

The generally U-shaped outer cutting blade portion has a second leg portion adjoining the second blade tine, and protruding beyond the planar end faces of the tines in the form of a tapered cutting surface portion, that terminates at a knife-edge. The distance by which tapered cutting surface portion protrudes beyond the tines is greater than the thickness of a wire to be seated and cut, so that knife-edge will cut completely through a wire seated in the terminal receptacle.

The hardened steel material of which the blade in configured and the increased thickness of the generally U-shaped outer cutting blade portion of the cutting blade relative to that of the tines within the interior channel region provide the knife-edge cutting surface portion of the cutting blade with strength and rigidity necessary to reliably and consistently sever a segment of wire, without suffering from the blade deflection and bending problem of the prior art cutting head assembly, described above.

Moreover, the reduced distance between the knife edge and the slot between the blade tines compared to that between a cutting knife and the slot between the tines of the wire-insertion blade of the prior art assembly prevents the knife edge from extending over the edge of the terminal receptacle in the course of engagement of the seating and cutting head with the terminal receptacle. As a result, the cutting edge will consistently and reliably engage and cut the wire within the confines of the seating area of the terminal receptacle, rather than attempt to sever the wire in a guillotine fashion, described above.

DETAILED DESCRIPTION

Figure 7:
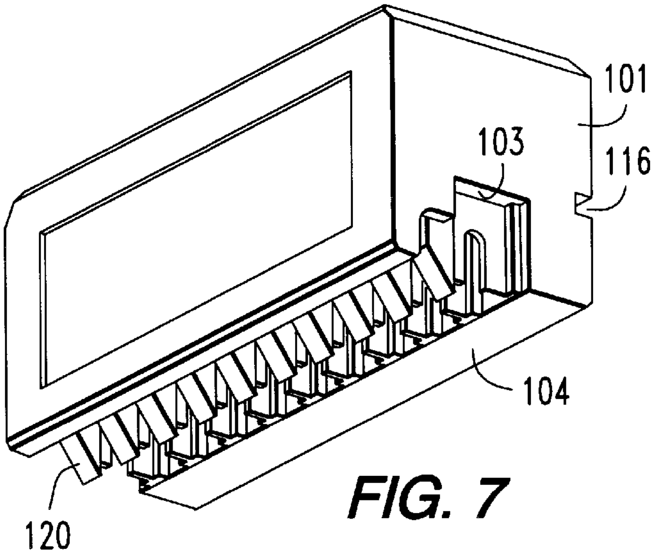
FIGS. 7 and 8 are perspective views of an embodiment of the unitary element impact tool head according to the present invention.
Figure 8:
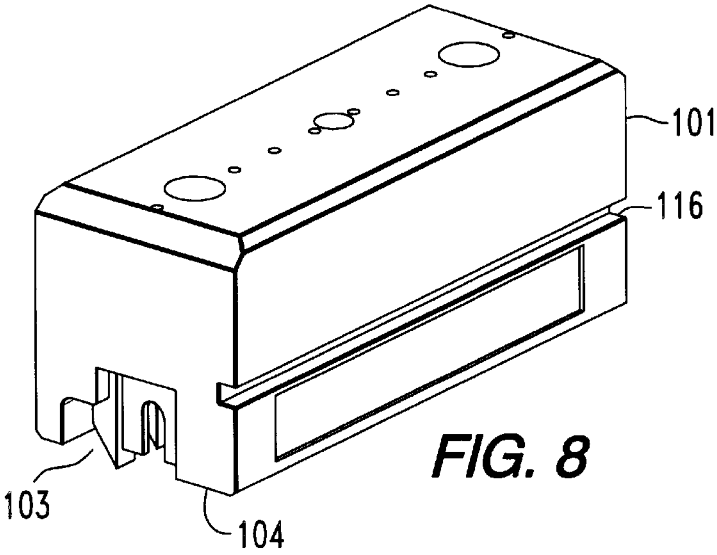
Figure 9:
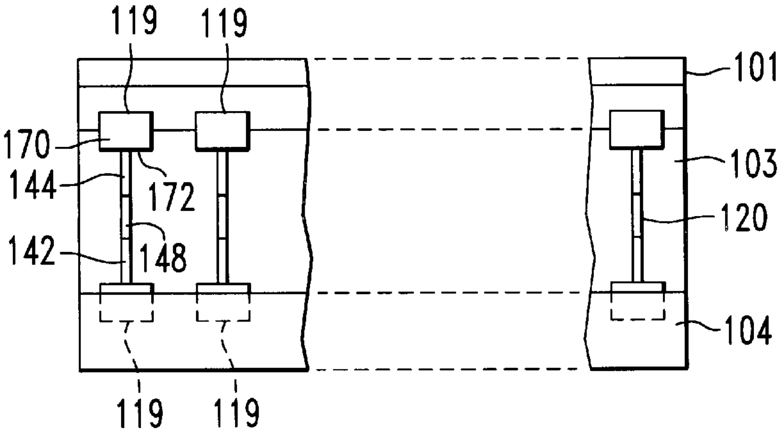
FIG. 9 is a front view of the unitary element impact tool head of FIGS. 7 and 8.

Referring now to FIGS. 7–9, the impact tool head configuration of the present invention is diagrammatically illustrated as comprising a cutting blade support block 101, having a generally rectangular shape and including a longitudinal channel or cavity 103 which extends the length of the block, between end faces 105 and 107 thereof and terminates at a first generally planar surface 109 of the block.

As will be described, cutting blade support block 101 may be made by plastic injection molding a suitable resilient insulating material, such as ten percent glass-filled polycarbonate, with the mold cavity of the injection mold apparatus being preloaded with a parallel arrangement of hardened steel cutting blades 120 along an intended longitudinal channel 103. Channel 103 is sized to accommodate terminal receptacles of a terminal block into which wires are inserted and cut by the tool. Preloading the mold with multiple spaced apart blades 120 ensures that the blades will be securely captured along the longitudinal channel 103 as shown in FIGS. 7, 8 and 9, with end faces of the blades substantially flush or coplanar with a planar surface 104 of block 101. Similar to the conventional blade support block, a longitudinal groove 116 is formed along the outer side surface 118 of the block 101, so that the cutting blade support block 101 may be retained within a channel of an impact tool head-mounting fixture.

Figure 10:
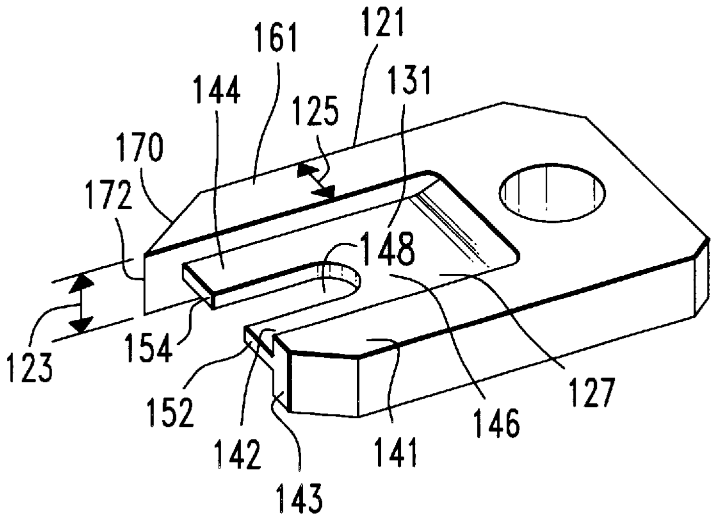
FIG. 10 is a perspective view of a wire-seating and cutting blade used in the unitary element impact head shown in FIGS. 7–9.

A respective cutting blade 120 is preferably configured in the manner of a type-110 seating and cutting blade manufactured by Harris Corp., Dracon Div., of Camarillo, Calif. The blade itself shown in perspective in FIG. 10 as having a generally U-shaped outer cutting knife portion 121, of a thickness 123 and width 125, surrounding a channel region 127, in which a reduced thickness interior wire-insertion blade portion 131 is provided. The generally U-shaped outer cutting knife portion 121 has a first leg portion 141, which adjoins a first blade tine 142 and terminates at a generally planar end face 143. Generally planar end face 143 is coplanar with end face 154 of second blade tine 144 and end face 154 of first tine 142. Blade tines 142 and 144 project from a tine body portion 146 and are spaced apart from one another by a slot 148, that extends a prescribed distance from planar end faces 152 and 154.

Generally U-shaped outer cutting knife portion 121 has a second leg portion 161, which adjoins second blade tine 144. However, unlike the first leg portion 141, which terminates at the generally planar end face 143, the second leg portion 161 protrudes beyond the planar end faces 152 and 154 of respective tines 142 and 144 in the form of a tapered cutting surface portion 170, which terminates at a knife-edge 172. The distance 174 by which tapered cutting surface portion 170 protrudes beyond the planar end faces 152 and 154 of respective tines 142 and 144 is greater than the thickness of a wire to be seated and cut, so that knife-edge 172 will pass completely through the wire seated in the terminal receptacle by the blade tines 142 and 144, in response to operation of the impact tool.

The hardened steel material of which the blade 120 is configured and the increased thickness 123 of the generally U-shaped outer cutting knife portion 121 of cutting blade 120 relative to that of the tines 142 and 144 within the interior channel region 127 provide the knife-edge cutting surface portion 170 of cutting blade 120 with the strength and rigidity necessary to cleanly sever a segment of wire, and such that deflection of the cutting edge is prevented.

Figure 11:
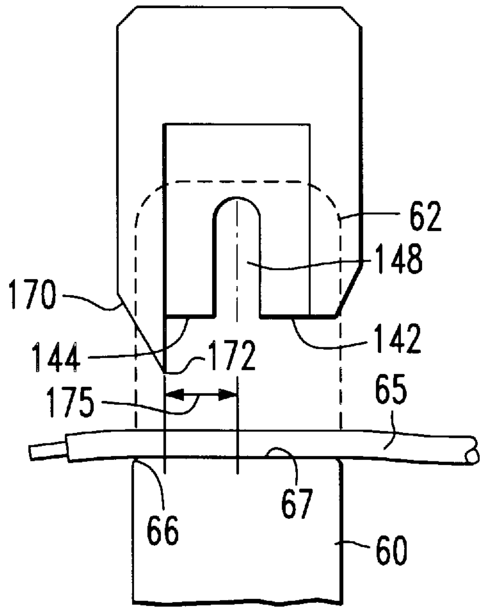
FIG. 11 is a diagrammatic end view of the wire-seating and cutting blade of FIG. 10 engaging a terminal receptacle.

In addition, as diagrammatically illustrated in FIG. 11, the distance 175 between the knife edge 172 and the slot 148 between the blade tines 142 and 144 is less than that between a cutting knife 52 and slot 25 between the tines 21 and 22 of the wire-insertion blade 12 of the prior art assembly, shown in FIGS. 1–6, described above, and is located so that knife edge 172, which is solid with blade tine 144, cannot extend over or be deflected around the lip or edge 66 of the terminal receptacle 60, in the course of engagement of the seating and cutting head with the terminal receptacle. As a result, the knife edge 172 will consistently and reliably engage and cut the wire 65 within the confines of the seating area of the terminal receptacle slot 62, rather than attempt to sever the wire in a guillotine fashion, along the side surface 68 of the terminal receptacle, as described above.

Figure 1:
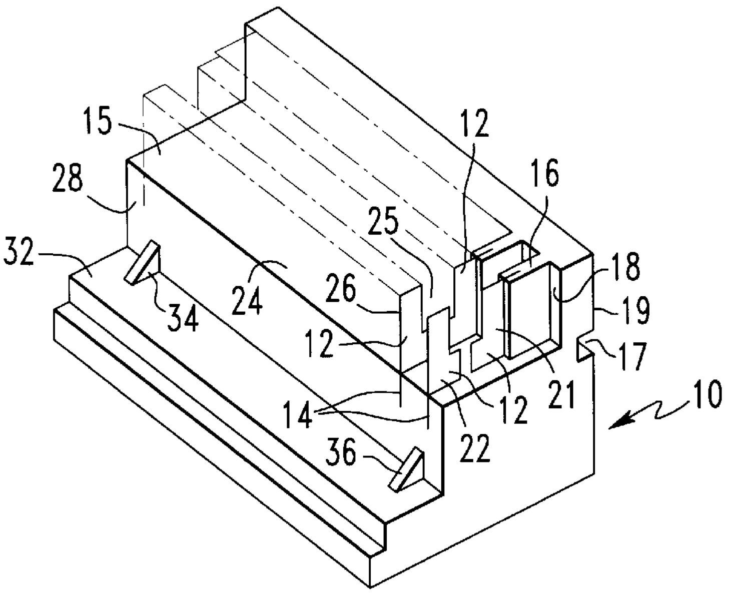
FIG. 1 PRIOR ART
FIG. 1 is a diagrammatic perspective illustration of a wire-insertion blade capture block of a conventional wire-insertion and cutting head assembly.
Figure 2:
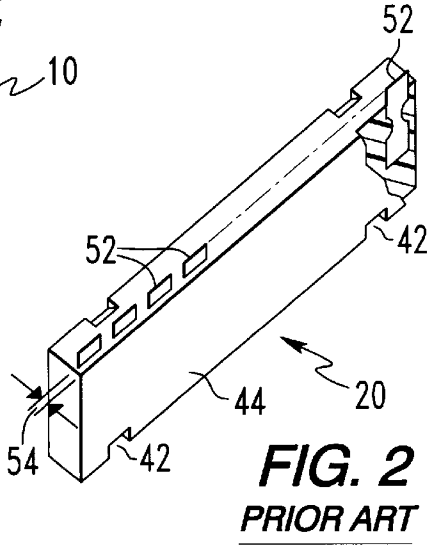
FIG. 2 PRIOR ART
FIG. 2 is partially cut-away perspective view of a knife blade support block of a conventional wire-insertion and cutting head assembly.
Figure 3:
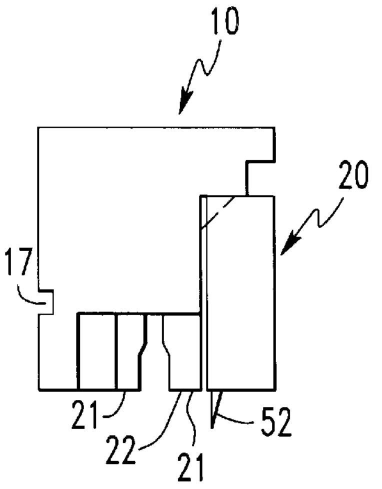
FIG. 3 PRIOR ART
FIG. 3 is a diagrammatic end view of an assembly of the cutting knife support block of FIG. 2 and the blade capture block of FIG. 1.
Figure 4:
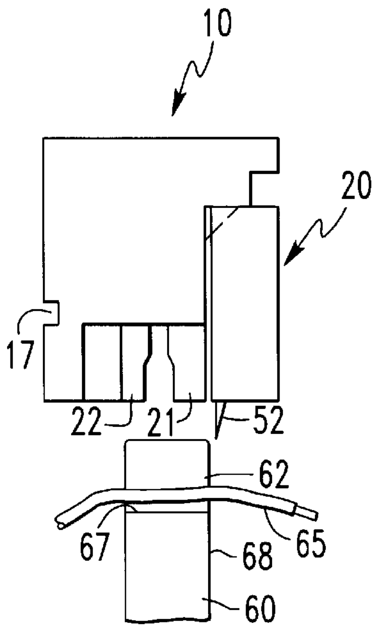
FIG. 4 PRIOR ART
FIGS. 4 and 5 diagrammatically illustrate the intended functionality of the wire-insertion and cutting assembly of the impact tool head of FIGS. 1–3.
Figure 5:
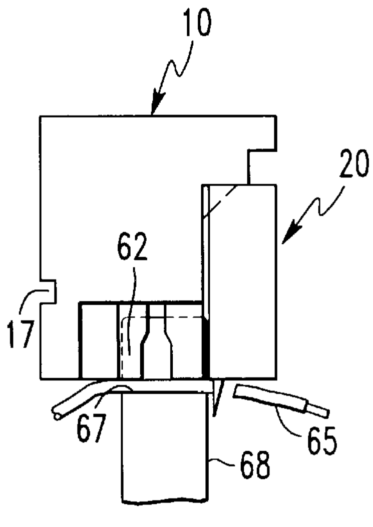
FIG. 5 PRIOR ART
Figure 6:
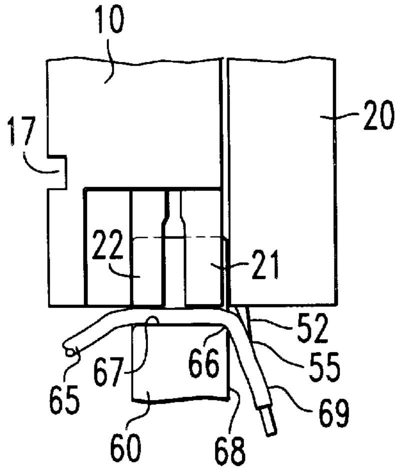
FIG. 6 PRIOR ART
FIG. 6 shows the unwanted deflection of a knife around the edge of a terminal receptacle during the operation of the wire-insertion and cutting assembly of FIGS. 1–3.

Namely, in accordance with the invention, since each of the plurality of wire-insertion and cutting blade elements 120 installed in cutting blade support block 101 has both the wire-insertion blade and the wire-severing knife molded as a single unitary element having the geometry of a Harris Dracon type 110 blade described above, rather than a two piece assembly as in the prior art configuration of FIGS. 1–3, play between the blade and the knife is prevented and the knife edge will always engage that portion of the wire 65 which is seated against the bottom surface 67 of the slot 62 of the terminal receptacle 60, and thereby effect a clean cut of the wire 65 against the bottom surface 67 of the terminal receptacle 60, as the wire is urged into the terminal receptacle by the operation of the impact tool head.

An individual cutting blade 120 of the present invention is preferably manufactured using an industrial standard metal injection molding process and sintering, used by powdered metal foundries, such as Advanced Forming Technology, Denver, Colo., in which a pulverized or powdered metal (e.g. hardened stainless steel powder) and a binder are combined into a flowable mixture and injected into a mold that is configured to produce the blade shape shown in FIGS. 7–11, described above. After removal from the mold, the binder is extracted (using a debinding bath and an elevated temperature). The part is then subjected to a curing/sintering process, which densifies the metal into a rigid, hardened steel cutting blade.

Multiple ones of the cutting blade are then mechanically inserted into a support jig of a plastic injection molding apparatus, and a suitable material, such as ten percent glass-filled polycarbonate, is injected into the mold cavity to encase the blades in the material. At the completion of the mold and cure cycle, the part is removed with the blades securely captured by the parallel slots 119 of the longitudinal channel 103 in the cutting blade support block 101, as shown in FIGS. 7 and 8. In the finished part, the depths of the slots are such that the end faces 152 and 154 of the blade tines 142 and 144 are generally coplanar or flush with the planar surface 104 of block 101.

As will be appreciated from the foregoing description, the inability of a conventional telephone wire impact tool-installed, wire-insertion blade and cutting knife assembly to consistently and reliably sever each wire seated and engaged by the head, due to the play and cutting knife misalignment problems described above are effectively obviated in accordance with the present invention by integrally combining both seating and cutting functions into a single element. By integrally molding both a wire-insertion blade and a cutting knife edge into a single element, play between the insertion blade and the knife is prevented, and the knife edge is located sufficiently close to the slot in the cutting blade to ensure that the knife edge will effect a clean cut of a respective wire against the surface of the terminal receptacle, as the wire is seated by the blade during operation of the impact tool head.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. A wire-insertion and cutting head for a craftsperson's impact tool comprising a plurality of unitary wire-insertion and cutting blade elements installed in a support member, each unitary wire-insertion and cutting blade element having both a wire-insertion blade and a cutting knife edge formed in a single continuous element, thereby preventing play between the insertion blade and the knife edge, and wherein said wire-insertion blade has first and second tines which are solid with and adjoin said cutting knife edge and have thickness less than the thickness of said cutting knife edge.

2. A wire-insertion and cutting head according to claim 1, wherein said knife edge is located relative to a slot in said wire insertion blade so as to cause said cutting knife edge to cut a respective wire against a surface of a wire-receiving terminal receptacle, as said respective wire is urged into said terminal receptacle by said blade during operation of said impact tool.

3. A wire-insertion and cutting head according to claim 1, wherein said wire-insertion blade has a slot between said tines, and wherein the distance between said knife edge and said slot between said blade tines is such that said knife edge is prevented from extending over or deflecting around an edge portion of a terminal receptacle in the course of engagement of said wire-insertion and cutting head with said terminal receptacle.

4. A wire-insertion and cutting head according to claim 1, wherein said blade is made of hardened steel.

5. A wire-insertion and cutting head for a craftsperson's impact tool comprising a plurality of unitary wire-insertion and cutting blade elements installed in a support member, each unitary wire-insertion and cutting blade element having both a wire-insertion blade and a cutting knife edge formed in a single continuous element, thereby preventing play between the insertion blade and the knife edge, and wherein said wire-insertion blade has first and second tines which are solid with and adjoin said cutting knife edge and have thickness less than the thickness of said cutting knife edge, and wherein said unitary wire-insertion and cutting blade element comprises a generally U-shaped outer cutting blade portion surrounding a reduced thickness interior wire-insertion blade portion, said generally U-shaped outer cutting blade portion having a first leg portion, which adjoins a first blade tine of said wire-insertion blade portion and terminates at a generally planar end face, coplanar with an end face of a second blade tine, said first and second blade tines being spaced apart from one another by a slot therebetween, and a second leg portion adjoining said second blade tine, and protruding beyond said planar end faces of said tines in the form of a tapered cutting surface portion, that terminates at a knife-edge.

6. A wire-insertion and cutting head according to claim 5, wherein said tapered cutting surface portion of said second leg portion protrudes beyond the tines by a distance greater than the thickness of a wire to be seated and cut, so that knife-edge cuts completely through a wire seated in a terminal receptacle.

7. A wire-insertion and cutting head for a wire impact tool comprising a generally rectangularly shaped cutting blade support block that includes a longitudinal channel, a plurality of wire-insertion and cutting blades installed along said channel and having end faces thereof substantially flush with a planar surface of said cutting blade support block, wherein a respective cutting blade is comprised of an outer knife edge portion solid with and surrounding a wire-insertion blade portion, said outer knife edge portion including a knife edge which protrudes beyond said wire-insertion blade portion, and wherein said wire-insertion blade portion has first and second tines which are solid with, adjoin and have thickness less than the thickness of said outer knife edge portion.

8. A wire-insertion and cutting head according to claim 7, wherein said wire-insertion blade portion has a slot between said tines, and wherein the distance between said knife edge and said slot between said blade tines is such that said knife edge is prevented from extending over or deflecting around an edge portion of a terminal receptacle in the course of engagement of said wire-insertion and cutting head with said terminal receptacle.

9. A method of installing and cutting a wire in a terminal block receptacle comprising the steps of:

(a) providing a craftsperson's impact tool having a wire-insertion and cutting head which contains a plurality of unitary wire-insertion and cutting blade elements installed in a support member, each unitary wire-insertion and cutting blade element having both a wire-insertion blade and a cutting knife edge formed as a single continuous element, and wherein said wire-insertion blade of said wire-insertion and cutting head has first and second tines which are solid with and adjoin said cutting knife edge and have thickness less than the thickness of said cutting knife edge;

(b) placing said impact tool into engagement with one or more wires placed in receptacles of a terminal block; and (c) operating said impact tool so as to cause wire-insertion blades of respective ones of said unitary wire-insertion and cutting blade elements to seat wires in receptacles of said terminal block, and to cause knife edges of respective ones of said unitary wire-insertion and cutting blade elements to cut wires against receptacles of said terminal block.

10. A method according to claim 9, wherein said wire-insertion blade has a slot between said tines, and wherein the distance between said knife edge and said slot between said blade tines is such that said knife edge is prevented from extending over or deflecting around an edge portion of a terminal receptacle in the course of engagement of said wire-insertion and cutting head with said terminal receptacle.

11. A method according to claim 9, wherein said wire-insertion and cutting blade elements are made of hardened steel.

12. A method of installing and cutting a wire in a terminal block receptacle comprising the steps of:

(a) providing a craftsperson's impact tool having a wire-insertion and cutting head which contains a plurality of unitary wire-insertion and cutting blade elements installed in a support member, each unitary wire-insertion and cutting blade element having both a wire-insertion blade and a cutting knife edge formed as a single continuous element;

(b) placing said impact tool into engagement with one or more wires placed in receptacles of a terminal block; and (c) operating said impact tool so as to cause wire-insertion blades of respective ones of said unitary wire-insertion and cutting blade elements to seat wires in receptacles of said terminal block, and to cause knife edges of respective ones of said unitary wire-insertion and cutting blade elements to cut wires against receptacles of said terminal block, and wherein said unitary wire-insertion and cutting blade element comprises a generally U-shaped outer cutting blade portion surrounding a reduced thickness interior wire-insertion blade portion, said generally U-shaped outer cutting blade portion having a first leg portion, which adjoins a first blade tine of said wire-insertion blade portion and terminates at a generally planar end face, coplanar with an end face of a second blade tine, said first and second blade tines being spaced apart from one another by a slot therebetween, and a second leg portion adjoining said second blade tine, and protruding beyond said planar end faces of said tines in the form of a tapered cutting surface portion, that terminates at a knife-edge.

13. A method according to claim 12, wherein said tapered cutting surface portion of said second leg portion protrudes beyond the tines by a distance greater than the thickness of a wire to be seated and cut, so that, in response to the operation of said impact tool in step (c), said knife-edge cuts completely through a wire seated in a terminal receptacle.

* * * * *